US005154978A

United States Patent [19]

Nakayama et al.

[11] Patent Number: 5,154,978

[45] Date of Patent: Oct. 13, 1992

[54] HIGHLY CORROSION-RESISTANT RARE-EARTH-IRON MAGNETS

[75] Inventors: Masatoshi Nakayama, Saku; Koichi Yajima, Urawa; Kenji Nakaya, Ichikawa; Kunihiro Ueda; Masanori Shibahara, both of Saku; Takatoshi Ooyama, Chiba; Michihiro Nemoto, Narita, all of Japan

[73] Assignee: TDK Corporation, Tokyo, Japan

[21] Appl. No.: 497,549

[22] Filed: Mar. 22, 1990

[30] Foreign Application Priority Data

| | | | |
|---|---|---|---|
| Mar. 22, 1989 | [JP] | Japan | 1-67521 |
| Mar. 23, 1989 | [JP] | Japan | 1-69289 |
| Mar. 24, 1989 | [JP] | Japan | 1-70582 |
| Apr. 25, 1989 | [JP] | Japan | 1-103344 |
| Jun. 5, 1989 | [JP] | Japan | 1-141235 |
| Jul. 10, 1989 | [JP] | Japan | 1-175645 |
| Sep. 27, 1989 | [JP] | Japan | 1-249023 |

[51] Int. Cl.[5] .......... B32B 15/04

[52] U.S. Cl. .......... 428/469; 428/411.1; 428/457; 428/692; 428/900; 427/129

[58] Field of Search .......... 427/129, 27; 148/101, 148/103; 428/694, 900, 558, 692, 411, 457, 469; 252/62.53, 62.54

[56] References Cited

U.S. PATENT DOCUMENTS

| | | | |
|---|---|---|---|
| 4,500,562 | 2/1985 | Jahn et al. | 427/27 |
| 4,548,864 | 10/1985 | Nakayama et al. | 428/694 |
| 4,693,927 | 9/1987 | Nishikawa et al. | 427/41 |
| 4,711,809 | 12/1987 | Nishikawa et al. | 428/694 |
| 4,749,608 | 6/1988 | Nakayama et al. | 428/694 |
| 4,863,805 | 9/1989 | Suzuki et al. | 428/558 |
| 4,889,767 | 12/1989 | Yokoyama et al. | 428/694 |
| 4,892,789 | 1/1990 | Nakayama et al. | 428/694 |

FOREIGN PATENT DOCUMENTS

| | | |
|---|---|---|
| 81908 | 7/1981 | Japan . |
| 022435 | 1/1986 | Japan . |
| 152201 | 7/1986 | Japan . |
| 6811 | 1/1988 | Japan . |
| 050916 | 3/1988 | Japan . |
| 154456 | 6/1988 | Japan . |
| 311432 | 11/1988 | Japan . |
| 103714 | 8/1989 | Japan . |
| 280303 | 11/1989 | Japan . |
| 109063 | 1/1990 | Japan . |

OTHER PUBLICATIONS

Nichols et al., Evaluating the Adhesion Characteristics of Glow-Discharge Plasma Polymerized Films by a Novel Voltage Cycling Technique; Journal of Applied Polymer Science-Applied Polymer Symposium 38, 21-33 (1984).

Raschke et al., Polyparaxylylene Electrets Usable at High Temperatures,-Journal of Applied Polymer Science, vol. 25, 1639-1644 (1980).

*Primary Examiner*—Paul J. Thibodeau
*Assistant Examiner*—R. Follett
*Attorney, Agent, or Firm*—Fish & Richardson

[57] ABSTRACT

A highly corrosion-resistant rare-earth-iron magnet has a paraxylylene polymer film or a chloropara-xylylene polymer film formed thereon. The substrate magnet surface has a roughness Ra of no more than one micron. The magnet has a plasma polymer film formed beforehand or afterwards. The plasma polymer film has a protective film consists of only carbon and hydrogen, with a refractive index decreasing from the boundary surface between the film and the magnet toward the exposed surface. The protective coating has a thickness about three times the surface roughness of the substrate magnet.

12 Claims, No Drawings

HIGHLY CORROSION-RESISTANT RARE-EARTH-IRON MAGNETS

BACKGROUND OF THE INVENTION

This invention relates to rare-earth-iron magnets coated on the surface for corrosion resistance. The invention further relates to rare-earth-iron magnets having a surface resistant to impacts as well as to corrosive attacks.

Rare-earth-iron magnets have recently attracted attention as new high-energy-product magnets because of their cost and machinability advantages over, and greater energy product than, samarium-cobalt magnets usually used for the purposes. Among the magnets of this type, a formulation consisting of 8 to 30 percent rare-earth element, 2 to 28 percent boron, and the balance iron and inevitable impurities, all in atomic ratio, has been found particularly effective.

However, the rare-earth-iron magnets are inferior in corrosion resistance to the Sm-Co system. To overcome this disadvantage, various surface treatments are being investigated. Inadequate impact resistance is another problem yet to be solved.

Rare-earth-iron magnets are produced by sintering or quenching. Magnets of this system contain much Nd and Fe both of which oxidize easily, and are susceptible to attacks by chemicals, especially acids and alkalis. Surface treatments, such as wet plating, tend to invite surface corrosion during pretreatment with acid or alkali or in the course of plating process. Even a magnet plated well can show reduced magnetic characteristics due to internal or intercrystalline corrosion under the influence of some chemical which has intruded. The materials made by quenching undergo less deterioration of magnetic characteristics with distortion by external forces or with heat than the materials obtained by sintering. However, quenched powders frequently are used with a plastic binder or the like, and high adhesion strength as coating materials is required for both the surface magnetic material and the binder material.

One solution known in the art to this problem is providing a plasma-polymerized film as a surface coating on the magnets (see Japanese Patent Application Public Disclosure No. 6811/1988). However, this process has a drawback in that the thicker the film the easier is the peeling of the protective coating film due to the internal stress developed in the protective film.

Another drawback of the plasma polymer film is that with the ordinary multi-element system a sufficient degree of polymerization can hardly be attained.

When acrylic acid or the like is used, for example, active oxygen is present while plasma polymerization is in progress. It thus causes plasma etching simultaneously with the plasma polymerization. Consequently, the resulting protective polymer film has insufficient hardness and density, and its degree of polymerization is low. Hence it provides an inadequate gas barrier. In addition, the presence of oxygen permits introduction of OH and other hydrophilic groups into the polymer film, rendering it difficult for the latter to function satisfactorily as an anticorrosive protective film.

Attempts have also been made to form a high-molecular-weight resin film as a protective coating on rare-earth sintered metal magnets (e.g. Japanese Patent Application Public Disclosure Nos. 198221/1986, 81908/1981, 63901/1985). High-molecular-weight resins cannot produce adequate bond to the metal surfaces, however, because they have high moisture and oxygen permeabilities and low affinity for the rare-earth sintered metal magnets, with the result that such films cannot provide satisfactory corrosion resistance. Among those resins, fluorocarbon resin and the like which require high-temperature baking can oxidize magnets, whereas epoxy resins and the like are inferior in anti-corrosion properties. Thus, no film has been provided which combines good adhesion with corrosion resistance.

The use of a high corrosion-resistant film, such as of polyxylylene, has been proposed, but the adhesion is extremely low (a vapor-phase polymerization process for the film was advocated by Union Carbide Corp. of the United States, and is commercially available). Forming a polyxylylene film by vacuum evaporation has also been introduced, but the resulting film has too low a degree of polymerization and its corrosion resistance is questionable (Japanese Patent Application Public Disclosure No. 103714/1980).

Thus, it has hitherto been impossible with conventional techniques to produce a rare-earth-iron magnet having a protective coating film which can adhere firmly to the magnet and exhibit satisfactory anticorrosive functions.

The present invention, therefore, aims at providing a rare-earth-iron magnet having a highly corrosion-resistant protective coating film of polyparaxylylene solidly adhering to the magnet and also providing a process for producing the same.

SUMMARY OF THE INVENTION

In order to overcome the foregoing problems, intensive investigations have been made. As a result, it has now been found that a highly corrosion-resistant rare-earth-iron magnet coated with a firmly adhering polymer film is obtained by preliminarily plasma-treating the surface of a rare-earth-iron magnet and then forming thereon a paraxylylene polymer film or chloroparaxylylene polymer film.

Thus, in one aspect of the invention, a process for producing a highly corrosion-resistant rare-earth-iron magnet which comprises plasma-treating the surface of a rare-earth-iron magnet and then forming a paraxylylene polymer film or a chloroparaxylylene polymer film on the treated surface, and also a highly corrosion-resistant rare-earth-iron magnet thus protected on the surface are provided.

In further studies on the solution of the prior art problems, it has also been found that the surface roughness has an important bearing upon the corrosion resistance of a rare-earth-iron magnet.

Another aspect of the invention is based on the discovery that a striking improvement in corrosion resistance is achieved by polishing the surface of a rare-earth-iron magnet, prior to the formation of a protective coating film thereon, to a surface roughness Ra in conformity with applicable JIS standards of about one micron or less. While the exact mechanism is yet to be clarified, the marked improvement is presumably attributable to the fact that the protective film covers the magnet adequately because its step coverage property is well matched with the surface roughness and also that the decreased surface roughness of the magnet reduces the original defects such as open pores and holes of the surface. Measurement of the water absorption rate of the magnet indicated its correlation with the surface roughness; a magnet with high surface roughness, i.e., with high water absorption rate, does not pass stringent weathering tests, no matter what protective film is formed thereon. Usually, the surface roughness values of rare-earth-iron magnets are fairly high, of the order of 2 μm or more in terms of Ra conforming to JIS.

In this aspect of the invention the surface of a rare-earth-iron magnet is polished to a surface roughness Ra of about 1 μm or less before the formation of a synthetic resin film such as a paraxylylene polymer film with or without the interposition of a plasma-polymerized film of hydrocarbon or other similar material, and then the protective film is formed on the polished surface. There has been no knowledge in the art of the correlation between corrosion resistance and surface roughness. Further, before the formation of such a protective film, the surface of the rare-earth-iron magnet alloy having a desired surface roughness is plasma-treated with Ar or other activating ion in the same manner as in the first aspect of the invention. This enhances the corrosion resistance of the subsequently formed protective coating film and also increases the adhesion, and sometimes the impact resistance too.

It has further been found that while a low surface roughness favors improvement of adhesion, the adhesion and corrosion resistance of a protective film can be adequately improved by the choice of the film thickness in correlation with the surface roughness of the magnet.

This invention is thus predicated upon the discovery that good results are obtained by choosing a corrosion-resistance vapor-phase polymerized film as the protective coating film and forming the film to a thickness about three times the surface roughness of the magnet.

The reason why the above structure improves the corrosion resistance of the magnet may be explained as follows. Presumably, the step coverage property of the polymer film formed by the vapor-phase process, which allows the resin to coat minute surface recesses as well as the tops of minute surface protuberances of a rare-earth-iron magnet, is well balanced with the surface roughness of the magnet, so that the protective coating film securely adheres to the magnet and covers it completely. As the surface roughens, it becomes increasingly uneven, enlarging the surface area and reducing the average thickness of the film formed thereon. In particular, the film at the bottoms of the surface recesses tends to become thinner. Here the vapor-phase polymerization which involves in situ polymerization using an easily diffusible and permeable gas proves advantageous.

Too thick a film is not economically warranted. In addition, it lessens the corrosion resistance, because, for one thing, the coating film comes off easily. It has been found that the polymer film formed by the vapor-phase polymerization underwent no deterioration of dimensional accuracy whereas an attempt to increase the film thickness with a coating material resulted in inadequate dimensional accuracy. This is because the polymerization takes place in the region with which the gas comes in contact and hence the magnet surface is coated to a uniform thickness.

The polymer film is a hydrocarbon or other film formed by plasma polymerization and/or a synthetic resin film such as a paraxylylene polymer film. Whichever is formed, it is necessary to clean the surface of the rare-earth-iron magnet beforehand. When the surface roughness is excessive, the magnet surface must be roughly ground to 4 μm or less.

While the paraxylylene and chloroparaxylylene polymer films have excellent corrosion resistance, they are too water-repellent, with an angle of contact as large as 90°, to be "wetted" with adhesive and attain adequate adhesion. When highly corrosion-resistant magnets or parts thus coated are used with electric or electronic devices or other appliances as attached to a part of the latter with an epoxy resin or other adhesive, very poor adhesion frequently hampers the practical use of the devices or the like. For practical use, some other fastener means such as fastening bands or mechanical fasteners, e.g., screws or rivets, must be employed in addition to the adhesive. This calls for extra operation step or space. It has just been found that the wettability with adhesive can be satisfactorily improved by either plasma-treating the paraxylylene or chloroparaxylylene polymer film surface or coating the surface with a plasma polymer film.

The coating with paraxylylene and chloroparaxylylene polymer films provides very high corrosion resistance but can be easily scratched. The coated object, therefore, is not suited for use in applications where it comes in mechanical contact or friction with other objects. It has now been found that a rare-earth-iron magnet which is readily wetted with adhesive and is little scratched by external forces can be obtained by further coating the paraxylylene or chloroparaxylylene polymer film with a thin layer of a synthetic resin film, especially of a resin coating material such as epoxy, acrylic, or melamine resin, which adds to the surface hardness and markedly improves the wettability with adhesive. More preferably, the protective material surface is plasma-treated or coated with a plasma polymer film. In this way the strength of bond between the paraxylylene or chloroparaxylylene polymer film and the synthetic resin film can be increased.

In still another aspect of the invention, the surface of a rare-earth-iron magnet (especially a sintered magnet) is formed with a vapor-phase-plated layer and then with a protective coating of a vapor-phase-process paraxylylene or chloroparaxylylene polymer film, thus strengthening the bond between the protective film and the magnet. Moreover, because the protective coating is formed by vapor-phase polymerization, with the radicals polymerized as filling up the pores, the coat is bound securely to the sintered alloy substrate and rarely comes off. Consequently, the corrosion resistance and durability of the permanent magnet are further improved. This is presumably attributed to the combination of two facts; one is that as paraxylylene radicals adhere to the first layer surface, they gain entrance into most of the micropores of the sintered alloy substrate and polymerize therein to fill up the pores, producing an anchoring effect; and the other is that the plated layer surface is activated to some degree. This presumption was confirmed to be appropriate by SEM photographic observation of the cross sections of coated magnets. It will be appreciated from the foregoing that the magnet according to the invention is perfectly corrosion-resistant and that the second protective layer, i.e., the paraxylylene or chloroparaxylylene polymer film, adheres well to the underlying layer.

DETAILED DESCRIPTION OF THE INVENTION

According to this invention, a rare-earth-iron magnet typified by a Nd-Fe-B or Misch metal magnet, which usually is either a sintered body of a composition R-T-B or R-T-B-M (in which R stands for a rare-earth element, T for Fe or a Fe-base transition metal, and M for at least one selected from Zr, Nb, Mo, Hf, Ta, and W) or a bonded magnet made of a mixture of such powder and a plastic binder up to about 10%, is coated with a film of paraxylylene or chloroparaxylylene polymer.

Plasma Treatment

In plasma treatment as a pretreatment according to the present invention, the surface of a rare-earth-iron magnet is first plasma-treated. As will be described later, the plasma treatment is intended to make a paraxylylene or chloroparaxylylene polymer film adherent to the rare-earth-iron magnet.

The gas for use in the plasma treatment is, e.g., Ar, He, Ne, or other rare gas, or a gas such as $H_2$, $N_2$, $O_2$, CO, $CO_2$, $H_2O$, $NO_2$, $NO_x$, or $NH_3$. These gases may be used singly or as a mixture. Of these gases, a rare gas such as Ar or an oxygen-containing gas such as $O_2$, CO, or $NO_x$ is preferred for the surface treatment of rare-earth-iron magnets, because such a gas improves the adhesion of the paraxylylene or chloroparaxylylene polymer film and eliminates any weak boundary layer (WBL).

As for the conditions for plasma treatment, usually a gas pressure of 0.01 to 10 Torrs, a DC or AC power supply, and an alternating-current frequency of 50 Hz to GHz can be used. The apparatus can be set to a power consumption of 10 W to 10 kW and to a treating time of 0.5 second to 10 minutes. These conditions may vary with the type of the magnet to be treated, the thickness of the paraxylylene or chloroparaxylylene polymer film, and the kind of the plasma gas to be employed. The angle of contact is desired to be 30° or below.

The plasma treatment as an after-treatment is performed likewise. It activates the surface of the paraxylylene or chloroparaxylylene polymer film; gives birth to various active radicals and functional groups such as OH, depending on the type of the gas used; improves the reactivity and wettability with the synthetic resin film that constitutes an adhesive; and admits the adhesive amply into the substrate to produce an anchoring effect and achieve a marked improvement in adhesion.

Paraxylylene or Chloroparaxylylene Polymer Film

In accordance with the process of the invention, a paraxylylene or chloroparaxylylene polymer film is formed on the plasma-treated surface of a rare-earth-iron magnet.

The paraxylylene or chloroparaxylylene polymer film is, e.g., Parylene (trade-mark) of a thermoplastic resin developed by Union Carbide Corp. of the United States. It is available in three types: Parylene N (polyparaxylylene), Parylene C (polymonochloroparaxylylene), and Parylene D (polydichloroparaxylylene). For the present invention Parylene C is preferred by reason of the lowest gas permeability.

In order to form a polymer film of such a Parylene on the surface of a rare-earth-iron magnet, the following procedure usually is carried out.

Citing the formation of a Parylene N film for example, a dimer of paraxylylene is prepared and introduced into an evaporation oven, where it is evaporated at no more than 1 Torr. The resulting gaseous paraxylylene is transferred into a pyrolytic oven, where it is thermally decomposed at 700° C. or below and 0.5 Torr or below. The decomposed gas then is led to a vapor deposition chamber in which a rare-earth-iron magnet is placed, and is allowed to deposit onto the magnet surface at ordinary temperature and at 0.01 to 0.2 Torr. With Parylene C or D, the same film-forming procedure is followed. The operation may be carried out using a Parylene vapor deposition apparatus Model 1010 (manufactured by Union Carbide Corp.).

The thickness of the paraxylylene or chloroparaxylylene polymer film is desirably in the range of 0.5 to 50 μm, more desirably in the range of 1 to 20 μm, to ensure adequate corrosion resistance.

A highly corrosion-resistant rare-earth-iron magnet of the invention is thus obtained. The procedure may include a step of cleaning the magnet surface by supersonic cleaner or other means before or after the plasma treatment.

In the second aspect of the invention the rare-earth-iron magnet surface is first polished to a surface roughness Ra of about 1 μm or below.

A rare-earth-iron magnet in the form of sintered or bonded magnet usually has a surface roughness Ra of 2 μm or above and must be polished to a roughness Ra of at most about 1 μm. The polishing may be done conventionally by barrel polishing, buffing, lapping, ordinary polishing, or other desired method.

In the case of a bonded magnet, its surface roughness can be controlled as well by adjusting the quantity of binder resin and molding conditions used.

Desirably, the rare-earth-iron magnet surface is plasma-treated in the manner described above.

Plasma Polymer Film

The plasma polymer film is formed prior to the formation of polyparaxylylene or chloroparaxylylene polymer film. The formation and the refractive index of the plasma polymer film on a rare-earth-iron magnet can be controlled, in accordance with the invention, by controlling the conditions for plasma polymerization, including the feed rate of the hydrocarbon monomer gas, reaction pressure, substrate temperature, electric power applied, and applied magnetic field. If the plasma polymer film to be formed has a ratio of numbers of atom (atomic composition ratio), in terms of H/C, of 1.5 or less, a tridemensionally fully crosslinked film will result. In this case, a film 0.2 μm or less in thickness can provide adequate resistance to corrosion. Such a plasma-polymerized protective coating can be formed by decreasing the feed rate of the hydrocarbon monomer gas, lowering the reaction pressure, and increasing the applied electric power. The reduced reaction pressure combines with the increased applied power to make the decomposition energy per unit amount of the monomer large enough to promote the decomposition and form a crosslinked plasma polymer film. The energy density, W/(FM), appropriate for the practice of the invention is $10^8$ J/kg or more (where W is the electric power for producing the plasma, in J/sec., F is the flow rate of the feed gas, in kg/sec., and M is the molecular weight of the feed gas). The gas to form the film is at least one of saturated or unsaturated lower hydrocarbons, such as methane, ethane, propane, butane, pentane, ethylene, propylene, butene, butadiene, acetylene, and methylacetylene. Such a gas may be used as a mixture with hydrogen or other inert gas, except for oxygen in any amount in excess of the trace amount as an inevitable impurity.

Cleaning the surface on which to form the plasma polymer film, e.g., by ultrasonic washing with an organic solvent, in advance will give good result.

It is even more effective to elevate the temperature of the magnet before the plasma polymer film is formed.

It has been found that the adhesion of the plasma polymer film to the magnet is improved when the refractive index of the plasma polymer film is graded so that the index is higher on the side where the hydrocarbon plasma polymer film is in contact with the rare-earth-iron magnet and is lower on the exposed side. In this way a protective film free from pinholing and excellent in both adhesion and corrosion resistance is obtained.

The higher the refractive index the greater the density of the plasma polymer film will be, with corresponding increases in adhesion to rare-earth-iron alloys and in barrier to the molecules of water and the like which would cause rusting. On the other hand, a plasma polymer film with a higher refractive index is more readily wetted with aqueous acid solutions and the like. If the plasma polymer film has a lower refractive index, it is less wettable with the aqueous acid solutions and the like and becomes more hydrophobic. For these reasons, it is highly advisable to form a plasma polymer film of a high refractive index as the under coating layer and a plasma polymer film of a low refractive index as the surface layer, since the double coating provides both excellent adhesion and rust-preventive effect.

The refractive index may be graded continuously or discontinuously. For example, a double-layer structure consisting of an under layer of a high refractive index and an upper (surface) layer of a low refractive index is the simplest and most economical.

The refractive index of the layer in contact with the rare-earth-iron magnet is 1.8 or more, preferably between 1.8 and 2.2. A refractive index below this range would reduce the adhesion. The refractive index of the exposed surface layer is 1.5 or more, preferably between 1.5 and 1.7. An index below this range would reduce the hydrophobic property. The refractive index of the plasma polymer film to be formed on a rare-earth-iron magnet can be controlled by adjusting the conditions for plasma polymerization, including the feed rate of the hydrocarbon monomer gas, reaction pressure, substrate temperature, electric power applied, and applied magnetic field.

The same applies to the formation of a plasma polymer film as an after-treatment. The polymer film provides added adhesion to other objects.

Synthetic Resin Film

The paraxylylene or chloroparaxylylene polymer film formed on the rare-earth-iron alloy magnet must be wettable with adhesive and also must be protected against scratching with other objects. To achieve the end, the polymer film is coated with a synthetic resin film having a hardness of no less than 4H and which exhibits good wettability.

Synthetic resin materials useful for this purpose include epoxy, acrylic, and melamine resins. These resins satisfy both the wettability and hardness conditions. The synthetic resin coating material is applied optionally, e.g., by dipping or spraying. The thickness of the applied coat after drying ranges from 2 to 30 μm, preferably from 5 to 15 μm. If the coat is too thin, it has insufficient hardness and tends to be scratched. If it is too thick, dimensional nonuniformity and poor accuracy will result.

Vapor-Phase Plating

The vapor-phase-plated layer for enhancing the adhesion of paraxylylene or chloroparaxylylene polymer can be formed in a number of ways known in the art, for example, as taught in Japanese Patent Application Public Disclosure No. 150201/1986. The available methods include vacuum evaporation, ion sputtering, ion plating, ion evaporation, and plasma evaporation. Vacuum evaporation is a method which uses resistance, electron-beam, RF induction, or other heating means to heat a coating material until an atomic or molecular vapor is formed, and allows the vapor to deposit on a magnet surface treated or not treated beforehand. Ion sputtering comprises introducing an inert gas, such as Ar, into a vacuum vessel, causing a discharge to ionize the gas, accelerating the ionized gas by the application of an electric field to bombard a target of coating material so as to form an ionized stream of the material, and allowing the ionized material to deposit on the surface of a magnet. Ion plating involves evaporation of a material by resistance, electron-beam, RF induction, or other heating technique, collision of thermoelectrons against the resulting vapor to form an ionized stream of material atoms or molecules, and acceleration of the stream by an electric field so as to deposit and form a film on the surface of a magnet. By ion evaporation is deposited a coating material vaporized by an electron gun, arc discharge, or other means on a magnet surface, simultaneously with, and at a certain ratio to, ions from a material ion source. Plasma evaporation consists of introducing a material gas into a vacuum chamber, converting the gas to a plasma by electric discharge or other means, and thereafter causing the plasma to form a film on a magnet surface.

Metals or metallic compounds which may be used in forming the first layer in accordance with the invention include such metals as Al, Ni, Cr, Cu, and Co and metallic compounds such as silica, alumina, chromia, titanium, carbide, titanium nitride, and aluminum nitride. Such a metallic compound is used in two ways; in one method the metallic compound is directly evaporated, and in the other a metal is evaporated and allowed to react with a gas of nitrogen, methane, oxygen, or the like being introduced into the reactor.

It has also been found that while the surface roughness is importantly related to the corrosion resistance of a rare-earth-iron magnet, the adhesion and corrosion resistance of a protective film can be satisfactorily improved by the choice of the film thickness in correlation with the surface roughness of the magnet.

This invention is thus based upon the discovery that good results are obtained by choosing a corrosion-resistance vapor-phase polymerized film as the protective coating film and forming the film to a thickness about three times the surface roughness of the magnet. The above structure improves the corrosion resistance of the magnet presumably because the step coverage property of the polymer film formed by the vapor-phase process, which allows the resin to coat minute surface recesses as well as the tops of minute surface protuberances of a rare-earth-iron magnet, is well balanced with the surface roughness of the magnet, so that the protective coating film securely adheres to the magnet and covers it completely. As the surface roughens, it becomes increasingly uneven, enlarging the surface area and reducing the average thickness of the film formed thereon. In particular, the film at the bottoms of the surface recesses tends to become thinner. Here the vapor-phase polymerization which involves in situ polymerization using an easily diffusible and permeable gas proves advantageous.

Rare-earth-iron magnets usually have a surface roughness Ra of 1 μm or more, more commonly 2 μm or more. It has been found that, with a magnet having the maximum Ra of about 4 μm, adequate adhesion and corrosion resistance are obtained in accordance with the invention without the need of polishing, provided the polymer film thickness is chosen to be about three times the Ra of the magnet. If the surface roughness is excessive too thick a film will result to an economical disadvantage and, moreover, the corrosion resistance decreases unexpectedly because exfoliation can occur easily.

The invention is illustrated by examples given below which are not limitative.

Throughout the examples various tests were conducted in conformity with the following procedures:

Crosscut Test

To evaluate the adhesion of each test Parylene film with respect to a magnet, a crosscut test was performed in the following manner. The test specimen surface was cut with knife blades at intervals of 1 mm in a checkered pattern. A piece of adhesive tape was affixed to the checkered surface and peeled off, observing to what extent the Parylene resin film too came off.

Moisture Resistance Test

To evaluate the rust-preventive properties of the test magnet, a moisture resistance test was conducted under the following conditions:

Environmental conditions: temperature=85° C., 90% RH

The test results are shown in Table 3.

Surface Observation

After each 1,000-hour run of moisture resistance test, the specimen was observed under an optical microscope with magnifications of 50× and 400×.

EXAMPLE 1

Sintered Magnet

An alloy of a formulation $Nd_{15}Fe_{77}B_8$ (Alloy 3) was made, crushed, and then pulverized using a jet mill to prepare a magnetic powder with an average particle diameter of 3.5 μm. This magnetic powder was compacted under a pressure of 1.5 tons/cm$^2$ in a magnetic field of 10 kOe. It then was sintered in a vacuum at 1100° C. for 2 hours and aged at 600° C. for one hour.

The magnetic characteristics of the magnet obtained were as shown in Table 1.

TABLE 1

| Alloy composition | | Br(KG) | iHc(kOe) | (BH)max |
|---|---|---|---|---|
| 1 | $Nd_{15}Fe_{77}B_8$ | 12.5 | 10.5 | 35.5 |

Next, this compact was placed in a plasma irradiator and the surface was plasma-treated using $O_2$ as the plasma gas at a gas pressure of 0.1 Torr and with an RF power supply (13.67 MHz) of 100 W. The angle of contact of the surface was 10°.

Using a Parylene evaporator (Model 1010), a Parylene C film was formed on the compact. During this, chloroparaxylylene dimer was introduced into the evaporator and evaporated at 150° C. and 1 Torr. The resulting gaseous chloroparaxylylene was fed to a pyrolytic oven, where it was thermally decomposed at 650° C. and 0.3 Torr. The decomposed gas was led into the evaporation chamber in which the compact was placed, and was evaporated at 25° C. and 0.05 Torr to form a 2 μm-thick film on the compact surface.

Thus a rare-earth-iron magnet coated with Parylene in accordance with the invention was obtained (Sample 1).

COMPARATIVE EXAMPLE 1

Sintered Magnet

For comparison purpose a magnet compact was made in the same manner as described in Example 1 with the exception that it was not plasma-treated, and then the same Parylene resin film was formed by vapor deposition on the compact surface

Comparative Sample 1

The Parylene resin lacked adhesion and readily came off.

EXAMPLE 2

Bonded Magnets

Two ingots of varied alloy compositions, $Nd_9Fe_{79.5}Zr_4B_{7.5}$ (Alloy 1) and $Nd_{8.5}Fe_{80}Zr_{3.5}B_8$ (Alloy 2), were made by weighing the materials, and melting and casting the weighed portions. They were melted by high-frequency heating, each shot against the surface of a single Cu roll (running at a peripheral speed of 20 m/sec) in an Ar atmosphere, and quenched rapidly to obtain alloy strips. Each strip was heat-treated in an Ar atmosphere at 700° C. for 30 minutes and then ground by a stamp mill until the average particle diameter was between 50 and 200 μm to obtain a magnet powder.

Each magnet powder was mixed with 2.5 wt. % of an epoxy resin, the mixture was compacted under a pressure of 5 tons per square centimeter, and the resin was cured at a temperature of 180° C. The magnetic characteristics of the compacts thus obtained were as shown in Table 2.

TABLE 2

| Alloy composition | | Br(KG) | iHc(kOe) | (BH)max |
|---|---|---|---|---|
| 2-1 | $Nd_9Fe_{79.5}Zr_4B_{7.5}$ | 6.8 | 13.0 | 10.0 |
| 2-2 | $Nd_{8.5}Fe_8Zr_{3.5}B_8$ | 6.6 | 12.6 | 9.5 |

These compacts were then placed in a plasma irradiator, and their surfaces were plasma-treated using Ar as the plasma gas at a gas pressure of 0.05 Torr and with an RF power supply (13.56 MHz) of 200 W. The contact angle of the surfaces was 12°.

Next, using a Parylene evaporator (Model 1010) and under the same conditions as in Example 1, a Parylene C film was formed on the compacts. The products, corresponding to the alloys 1 and 2, are designated Samples 2-1 and 2-2, respectively.

COMPARATIVE EXAMPLE 2

Bonded Magnet

A magnet compact was made in the same way as in Example 2 except that the plasma treatment was eliminated by way of comparison, and the Parylene resin was vapor deposited on the compact surface (Comparative Sample 2).

The Parylene film was poorly adherent and readily came off.

Samples 1, 2-1, 2-2, and Comparative Samples 1 and 2 thus obtained were subjected to crosscut tests so as to evaluate the adhesion of the Parylene films to the magnets.

Samples 1, 2-1, and 2-2 showed almost no trace of peeling, whereas Comparative Samples 1 and 2 partly peeled off.

The test results are given in Table 3.

The results of moisture resistance tests and surface observation are also given in Table 3.

Table 3 shows that the rare-earth-iron magnets according to the invention attained remarkable improvements in corrosion resistance, with improved adhesion of the paraxylylene and other polymer films as protective coating films.

TABLE 3

Results of crosscut and moisture resistance tests

| Sample | Surface treatment | Rusting | K* % | Surface observation |
|---|---|---|---|---|
| 1 | Plasma treatment + Parylene C | No rusting in 1000 hrs. | 0 | No change |
| 2-1 | Plasma treatment + Parylene C | No rusting in 1000 hrs. | 0 | " |
| 2-2 | Plasma treatment + Parylene C | No rusting in 1000 hrs. | 0 | " |
| Comparative | | | | |
| 1 | Parylene C alone | Started rusting in 250 hrs. | 43 | Partial film peeling from magnet, with surface unevenness |
| 2 | Parylene C alone | Started rusting in 300 hrs. | 35 | Partial film peeling from magnet, with surface unevenness |

*Peeling rate on a crosscut test.

EXAMPLE 3

Bonded Magnets

Samples 2-1 and 2-2 of the compacts according to Example 2 had a surface roughness Ra of 2.1 μm. Their surfaces were polished to 0.3 μm.

The sample surfaces were then plasma-treated under the following conditions.

Using $O_2$ gas at a pressure of 0.1 Torr and with an RF power supply of 100 W, the surfaces were plasma-treated. The contact angle of the surfaces was 10°.

Comparative Samples 3-1 and 3-2 were prepared as counterparts of Samples 2-1 and 2-2, with surface polishing but without plasma treatment.

All these compacts and comparative samples were coated with Parylene C. Those corresponding to Samples 2-1 and 2-2 and which were plasma-treated are herein referred to as Samples 3-1 and 3-2, respectively. Those corresponding likewise but not plasma-treated are referred to as Comparative Examples 3-1 and 3-2. As the synthetic resin, Parylene C was thermally decomposed and polymerized at 25° C. and 0.05 Torr to form a film 10 μm thick. Each test magnet material was placed on an iron plate, and another piece of magnet material made in the same way was dropped from a height of 10 cm to hit the stationary material. This procedure was repeated ten times. Then, a moisture resistance test was conducted at 90° C. and 90% RH. These results, together with the results of surface observation, are given in Table 4.

EXAMPLE 4

Sintered Magnet

The sintered magnet of Example 1 was used. Its surface roughness was 2.3 μm. In the same way as in Example 3, it was polished to a surface roughness of 0.3 μm. The alloy was plasma-treated and designated Sample 4. The same alloy not plasma-treated is designated Comparative Sample 4. The both were coated with a Parylene C film under the same conditions as used in Example 3. The results are summarized in Table 5.

TABLE 4

Moisture test results (with Parylene C)

| Sample | Surface polish | Plasma treatment | Rusting | Surface observation |
|---|---|---|---|---|
| Bonded | | | | |
| 3-1 | Yes | Yes | No rusting in 1000 hrs. | No change |
| 3-2 | Yes | Yes | No rusting in 1000 hrs. | " |
| Comparative | | | | |
| 3-1 | Yes | No | Started rusting in 250 hrs. | Rust grew from minute cracks, with tarnish. |
| 3-2 | Yes | No | Started rusting in 280 hrs. | Rust grew from minute cracks, with tarnish. |

TABLE 5

Moisture test results (with Parylene C)

| Sample | Surface polish | Plasma treatment | Rusting | Surface observation |
|---|---|---|---|---|
| Sintered | | | | |
| 4 | Yes | Yes | No rusting in 1000 hrs. | No change |
| Comparative | | | | |
| 4 | Yes | No | Started rusting in 300 hrs. | Rust grew from minute cracks, with tarnish. |

EXAMPLE 5

Each compact in Example 2 was placed into a plasma polymerizer. As a base or lower layer, a hydrocarbon polymer film was formed on the surface of the compact under the following conditions: pressure, 0.02 Torr; RF electric power, 1000 W; and $CH_4$, 3 SCCM. The film formation was carried on until the film reached a thickness of about 200 Å as measured with an ellipsometer. The film so formed was examined on a secondary electron mass analyzer SIMS and was found to have an H/C ratio of 1.15. Its index of refraction was measured using an ellipsometer to be 1.95. The angle of contact was determined to be 30°.

Next, a top or upper layer of hydrocarbon polymer film was formed on the surface of the compact under the conditions of: pressure, 0.1 Torr; RF electric power, 300 W; and $CH_4$ 20 SCCM. The film formation was continued until a film thickness of about 2000 Å was attained as measured with an ellipsometer. A secondary electron mass analyzer SIMS showed that the film had an H/C ratio of 1.6. The refractive index was ellipsometrically determined to be 1.65. The angle of contact was measured to be 88°.

The compacts thus obtained with protective coatings (designated Samples 5-1 and 5-2 for Alloys 2-1 and 2-2, respectively, and the samples of Alloy 1 coated with only a lower layer of 2200 Å thickness and only with an upper layer of the same thickness, respectively, are referred to as Samples 5-3 and 5-4) were subjected to moisture resistance tests in an environment of 85° C. and 90% RH. By way of comparison, those not surface-treated (Comparative Samples 5-1 and 5-2) were also tested under identical conditions. The results are summarized in Table 6.

TABLE 6

| Sample | | Surface treatment | H/C lower layer/ upper layer | Rusting |
|---|---|---|---|---|
| Sample | 5-1 | Yes | 1.15/ 1.6 | No rusting in 1200 hrs. |
| " | 5-2 | " | 1.15/ 1.6 | " |
| " | 5-3 | " | 1.15/ 1.15 | No rusting in 1200 hrs. excepting partial tarnishing. |
| " | 5-4 | " | 1.6/ 1.6 | No rusting in 1200 hrs. excepting partial tarnishing. |
| Comp. | 5-1 | No | — | Started rusting in 120 hrs. |
| " | 5-2 | " | — | Started rusting in 90 hrs. |

Samples 5-1 to 5-4 were then coated with a film of Parylene C under the same conditions as used in Example 1. They all showed greater corrosion resistance than those listed in the above table.

EXAMPLE 6

The sintered magnet in Example 1 was placed in a plasma polymerizer. A hydrocarbon polymer film was formed on the compact under the conditions of: pressure, 0.02 Torr, RF power, 800 W; and $CH_4$, 5 SCCM. The film formation was monitored with an ellipsometer and continued until the measured film thickness reached about 0.15 μm. The film so formed had an H/C ratio of 1.21 as measured with a secondary ion mass spectrometer SIMS.

The protectively coated compact then was further coated with Parylene C by the same method and under the same conditions as in Example 3. It showed better moisture test results than the other samples. Owing to the firm adhesion of Parylene C, the magnet clearly indicated superior impact resistance.

EXAMPLE 7

Bonded Magnets

The compacts of Alloys 2-1 and 2-2 obtained in Example 2 were plasma-treated on the surface under the following conditions.

For the surface plasma treatment $O_2$ gas was used at a pressure of 0.1 Torr, with an RF power supply at 13.56 MHz of 100 W. The angle of contact on the surface was 10°.

Next, the compacts were charged into a plasma polymerizer, and a hydrocarbon polymer film was formed on the compact surface with the conditions of 0.02 Torr, RF power supply of 800 W, and $CH_4$ 5 SCCM. The film-forming treatment was carried on until a film about 0.15 μm thick was formed as measured with an ellipsometer. Measurement with a secondary ion mass spectrometer (SIMS) indicated that the H/C ratio was 1.21.

A 10 μm-thick film of Parylene C was formed on the compacts by thermal decomposition and polymerization of a monochloroparaxylene dimer at 25° C. and 0.05 Torr. The coated compacts are designated Comparative Samples 7-1 and 7-2 corresponding to Alloys 1 and 2, respectively. The comparative samples were plasma-treated using $H_2$ as the plasma gas, at a gas pressure of 0.2 Torr and with the power supply of 200 W from a 100 kHz power source. The plasma-treated samples are designated Samples 7-1 and 7-2. With various adhesives shown in Table 7, Comparative Samples 7-1 and 7-2 and Samples 7-1 and 7-2 were affixed with epoxy adhesive to square iron columns each measuring 1 cm by 1 cm at the bottom and 10 cm high. Peeling tests were conducted using a tensiometer Tensilon, and the results are given in Table 7.

EXAMPLE 8

Sintered Magnets

The sintered compact prepared in Example 1 was treated in the same manner as in Example 7, and a sintered magnet having a surface coating of a plasma polymer film with an H/C ratio of 1.21 was obtained. It was coated with a 10 μm-thick film of Parylene C. Under the same conditions as in Example 7, it was plasma-treated. The treated product is designated Comparative Sample 8. Its adhesion test results are shown in Table 7.

Comparative Example 8 was then placed in a plasma polymerizer, and a hydrocarbon polymer film was formed on its surface at a pressure of 0.02 Torr, RF power supply of 800 W, and $CH_4$ 5 SCCM. The film was formed until a thickness of about 0.15 μm was obtained as measured with an ellipsometer. Measurement on a secondary ion mass spectrometer SIMS indicated that the H/C ratio was 1.21. The sample so obtained is hereinafter referred to as Sample 8.

With various adhesives shown in Table 7, Comparative Sample 8 and Sample 8 were affixed with epoxy adhesive to the above-mentioned square iron columns. The results are also shown in Table 7.

In the table "C" means the boundary surface between Parylene and adhesive and "E" the boundary surface between iron and adhesive.

TABLE 7

| Sample | Bond strength kg/cm2 | Peeled or broken along |
|---|---|---|
| 7-1 | 120 | E |
| 7-2 | 122 | E |
| 7-3 | 121 | E |
| 8 | 123 | E |
| Comparative | | |
| 7-1 | 28 | C |
| 7-2 | 31 | C |
| 8 | 32 | C |

EXAMPLE 9

Bonded Magnets

A 10 μm-thick film of Parylene C was formed on the compacts of Example 2 by thermal decomposition and polymerization of a monochloroparaxylene dimer at 25° C. and 0.05 Torr. The bonded magnets of Alloys 1 and 2 thus provided with an anticorrosive coating were plasma-treated using $H_2$ as the plasma gas at a pressure of 0.2 Torr and with a power supply of 200 W from a 100-kHz source. They were then spray coated with epoxy resin to varied dry thicknesses ranging from 0 to 40 μm. As for the bonded magnet of Alloy 1, the surface (pencil) hardness and dimensional accuracy were as shown in Table 8. Dimensional accuracy values are given as means of 20 measurements each and as dispersions. Of the samples thus obtained, those having a dry epoxy resin coat of 10 μm thickness (Samples 9-1 and 9-2 corresponding to Alloys 1 and 2) were affixed with epoxy resin to square iron columns 1 cm×1 cm at the bottom and 10 cm long for adhesion testing. Using a tensiometer Tensilon, peeling tests were conducted. Table 9 shows the results. In the table "C" means the boundary surface between Parylene and adhesive and "E" the boundary surface between iron and adhesive.

EXAMPLE 10

Sintered Magnet

The compact of Example 1 was treated in the same way as for the preparation of the corrosion-resistant bonded magnets in the preceding example. A sintered magnet having a surface coating film with an H/C ratio of 1.21 was obtained. It was coated with a 10 μm-thick film of Parylene.

This sample was anticorrosively treated again by the same method as above. It was further plasma-treated under conditions identical with Example 9. Acrylic resin was applied to the surface to form films of varied dry thicknesses ranging from 0 to 40 μm. The surface hardness and dimensional accuracy values were as shown in Table 8. One coated with the acrylic resin to a dry thickness of 10 μm (Sample 10) was subjected to an adhesion test and gave results shown in Table 9.

EXAMPLE 11

Bonded Magnets

The bonded magnets of Alloys 1 and 2 coated with Parylene C in Example 9 were placed in a plasma polymerizer, and a hydrocarbon polymer film was formed over the compact surface at a pressure of 0.02 Torr and with an RF power supply of 800 W and with $CH_4$ of 5 SCCM. The H/C ratio was 1.21. The coated Alloy 2 was further coated with melamine resin to varied dry thicknesses of 0 to 40 μm. Hardness test results are given in Table 8. Those coated with melamine resin to a dry thickness of 10 μm (Samples 11-1 and 11-2 corresponding to Alloys 2-1 and 2-2) were bonded with epoxy resin to iron bar surfaces. The results of adhesion tests are given in Table 9.

EXAMPLE 12

Sintered Magnet

The compact of Example 1 was treated in the same manner as in the afore-described preparation of the corrosion-resistant bonded magnet, and a sintered magnet having a surface coating with an H/C ratio of 1.21. It was coated with Parylene C to a thickness of 10 μm.

The anticorrosively treated Alloy 3 magnet was coated with a plasma polymer film under the conditions of Example 11. An epoxy adhesive was applied to one (Sample 12) having the epoxy resin film 10 μm thick dry. The adhesion test results are given in Table 9.

TABLE 8

| Thickness of coat, μm | 0 | 1 | 2 | 5 | 15 | 30 | 40 |
|---|---|---|---|---|---|---|---|
| (Example 9) | | | | | | | |
| Hardness, H | 2 | 2 | 4 | 5 | 5 | 5 | 5 |
| Accuracy, ±μm | 0.1 | 0.1 | 0.1 | 0.5 | 2 | 5 | 5 |
| (Example 10) | | | | | | | |
| Hardness, H | 2 | 2 | 4 | 5 | 5 | 5 | 5 |
| Accuracy, ±μm | 0.1 | 0.2 | 0.2 | 0.5 | 2 | 5 | 5 |
| (Example 11) | | | | | | | |
| Hardness, H | 2 | 2 | 4 | 5 | 5 | 5 | 5 |
| Accuracy, ±μm | 0.1 | 0.2 | 0.2 | 0.5 | 2 | 5 | 5 |

TABLE 9

| Sample | Bond strength kg/cm2 | Peeled or broken along |
|---|---|---|
| 9-1 | 120 | E |
| 9-2 | 122 | E |
| 10 | 121 | E |
| 11-1 | 123 | E |
| 11-2 | 120 | E |
| 12 | 121 | E |

EXAMPLE 13

The sintered magnet of Example 1, with a surface roughness Ra of 2.1, was cleared of surface contaminants such as oxides by introducing Ar gas at a vacuum degree of $5\times10^{-5}$ Torr or below and then subjecting the magnet to an electric discharge at 500 V for 15 minutes under a pressure of $1\times10^{-2}$ Torr. The cleaned sintered alloy was immediately coated with a thin film of Al, about 5 μm thick, by ion plating (Comparative Sample 13). Next, Parylene C was deposited by vapor-phase polymerization to form a 5 μm-thick film (Sample 13). Their characteristics were determined and the results are given in Table 10. Comparative Sample 13-1 was subjected to sealing treatment by shot peening and then to chromating (Comparative Sample 13-2).

Corrosion resistance, magnetism reduction, and dimensional stability were evaluated on the following criteria:

Corrosion resistance: An aqueous solution containing 5% sodium chloride at 35° C. was sprayed over each sample and the time required for the start of rusting was measured.

Dimensional stability: Each sample dimension was measured at 20 points and the dispersion of the values was determined.

Magnetism reduction: The rate of magnetism reduction after subjection to hot and humid environments at 90° C. and 90% RH for 90 days was recorded.

EXAMPLE 14

The magnet of Example 13 was coated with a thin film of Cu by ionizing evaporation, forming a deposit layer about 5 μm thick over the sintered alloy surface (Comparative Sample 14). An additional film of Parylene C., about 10 μm thick, was formed by vapor-phase polymerization (Sample 14). Epoxy resin was applied to and thermally cured on Comparative Sample 14 (Comparative Sample 14-1). The results are shown in Table 10.

Sample 13 and Comparative Sample 14-1 were sectioned and observed. The section of Sample 13 contained no bubble, with the micropores solidly filled up. Comparative Sample 14-1 had a thin layer formed over the pores but showed scattering points where the resin and magnet were not firmly bonded together.

TABLE 10

| Sample | Corrosion resistance, h | Dimensional stability | Magnetism reduction |
|---|---|---|---|
| 13 | >120 | 0.2 | 0.5 |
| 14 | >120 | 0.2 | 0.2 |
| Comparative | | | |
| 13 | 10 | 0.2 | 4 |
| 14 | 8 | 0.5 | 5 |
| 13-1 | 19 | 1 | 3 |
| 14-1 | 24 | 2 | 2 |

EXAMPLE 15

Bonded magnet

The bonded magnet (compact of Sample 2-1) of Example 2 was employed.

The surface roughness Ra of the compact was 2.1 μm.

The test pieces were plasma-treated on the surface under the following conditions.

$O_2$ gas was employed at a gas pressure of 0.1 Torr in plasma-treating the surface with an electric power of 100 W from an RF source at 13.56 MHz. The contact angle of the surface was 10°.

Next, the compacts were charged into a plasma polymerizer, and a hydrocarbon polymer film was formed on their surface under the conditions of: pressure, 0.02 Torr; RF electric power, 800 W; and $CH_4$, 5 SCCM. The film forming was carried on until films about 0.15 μm, 2.0 μm, and 7.0 μm in thickness as measured with an ellipsometer were obtained. The three films were determined to have an H/C ratio of 1.21 on a secondary ion mass spectrometer SIMS.

The compacts thus separately coated with one of three protection films (Samples 15-1, 15-2, and 15-3) were tested for moisture resistance under environmental conditions of 120° C., 100% RH, and 2 atm. Table 11 summarizes the results.

EXAMPLE 16

Sintered magnets were obtained using Alloy 1 of Example 1 and following the procedure of Example 15. The surface roughness was 2.3 μm (Samples 16-1, 16-2, and 16-3). The results are shown in Table 11.

EXAMPLE 17

Bonded magnets

The compacts of Example 15 were formed with a film of Parylene C instead of the plasma polymer film. As the protective film, Parylene C was formed into a film 15.8 μm thick by thermal decomposition and polymerization at 25° C. and 0.05 Torr. The products are designated Sample 17-1, 17-2, and 17-3. The results are given in Table 11.

EXAMPLE 18

Sintered magnet

Alloy 3 obtained in Example 16 was used. Under the same conditions as in Example 3, a film of Parylene C was formed on this alloy. The resulting samples are designated 18-1, 18-2, and 18-3. Table 11 shows the results.

TABLE 11

| Sample | | Results of moisture resistance tests: Time period for start of rusting or change in film | Surface condition after 120 hrs. of moisture resistance test |
|---|---|---|---|
| Bonded magnets: | | | |
| Sample | 15-1 | Film blistered in 12 hrs. | Point rusting over the entire surface. |
| " | 15-2 | Point rusting in 60 hrs. | Partial point rusting. |
| " | 15-3 | No rusting in 120 hrs. | No change. |
| Sintered magnets: | | | |
| Sample | 16-1 | Film partly peeled in 12 hrs. | Point rusting throughout. |
| " | 16-2 | Point rusting in 50 hrs. | Many corrosion points at corners. |
| " | 16-3 | No rusting in 120 hrs. | No change. |
| Bonded magnets: | | | |
| Sample | 17-1 | Point rusting from upper part in 50 hrs. | Partial point rusting. |
| | 17-2 | Point rusting from upper part in 100 hrs. | Point rusting over part of the surface. |
| | 17-3 | No rusting in 120 hrs. | No change. |
| Sintered magnets: | | | |
| Sample | 18-1 | Point rusting from upper part in 40 hrs. | Partial point rusting. |
| | 18-2 | Point rusting from upper part in 90 hrs. | Point rusting over part of the surface. |
| | 18-3 | No rusting in 120 hrs. | No change. |

The above table clearly shows that magnet compacts attain excellent corrosion resistance when the protective coating film formed thereon is at least three times the surface roughness of the compact.

As has been described hereinbefore, the process of the invention produces a rare-earth-iron magnet having a dense, pinhole-free Parylene resin film formed and firmly secured to the magnet surface. The rare-earth-iron magnet of the invention is superior in corrosion resistance to conventional magnets of this type and retains the magnetic characteristics of the rare earth magnets. Moreover, the coating solidly adhering to the magnet surface makes the magnet outstandingly resistant to impacts.

The highly corrosion-resistant rare-earth-iron magnet of the invention, therefore, is useful in services under stringent conditions which involve corrosive attacks. Therefore, this is an invention of very great technical significance to the art.

The highly corrosion-resistant article coated with a paraxylylene or chloroparaxylylene polymer film and further plasma-treated or covered with a plasma polymer film in accordance with the invention is obviously improved in wettability with adhesive and adhesion. The article can, therefore, be easily fixed to a desired point using adhesive in various applications.

Furthermore, as will be appreciated from Examples that the article so coated protectively attains not merely improved wettability with adhesive and adhesion but is imparted with added hardness. It therefore can be easily fixed to a desired point with adhesive and also used where it is subject to friction.

It should also be clear that the interposition of a vapor deposited film imparts a very great corrosion resistance and dimensional stability to a vapor-phase polymer film of paraxylylene or the like formed on a magnet of the invention. Corrosion resistance is low with only a vapor-deposited metal film. Even sealing cannot provide adequate corrosion resistance. Where a resin coating alone is used, magnetism reduction was observed presumably because of the internal water content. It also poses a dimensional accuracy problem.

What is claimed is:

1. A corrosion-resistant rare-earth-iron magnet which consists essentially of a rare-earth-iron substrate magnet having a surface treated with a plasma from one or more gases selected from rare gases and oxygen-containing gases, and a protective coating of a paraxylylene polymer film or a chloroparaxylylene polymer film formed by pyrolysis of dimers of paraxylylene or chloroparaxylylene on the surface of the substrate magnet treated with the plasma.

2. A magnet according to claim 1 wherein said substrate magnet has a surface roughness Ra of no more than one micron.

3. A magnet according to claim 1 wherein the protective coating of a paraxylylene polymer film or a chloroparaxylylene polymer film is further coated with a plasma polymer film.

4. A magnet according to claim 1 wherein the protective coating of a paraxylylene polymer film or a chloroparaxylylene polymer film is plasma-treated and then coated with a synthetic resin film.

5. A corrosion-resistant magnet according to claim 4 wherein the synthetic resin film has a hardness of at least 4H.

6. An article according to claim 5 wherein said synthetic resin film is selected from the group consisting of epoxy, acrylic, and melamine resins.

7. A magnet according to claim 1 wherein the protective coating has a thickness about three times the surface roughness of the substrate magnet.

8. A corrosion-resistant rare-earth-iron magnet which consists essentially of a rare-earth-iron substrate magnet, a plasma polymer film of hydrocarbon on the substrate magnet, said hydrocarbon selected from the group consisting of saturated or unsaturated lower alkyl hydrocarbons, and a protective coating of a paraxylylene polymer film or a chloroparaxylylene polymer film formed by pyrolysis of dimers of paraxylylene or chloroparaxylylene on the plasma polymer film.

9. A magnet according to claim 8 wherein said plasma polymer film consists of only carbon and hydrogen, with a refractive index decreasing from the boundary surface between the film and the substrate magnet toward the exposed surface.

10. A magnet according to claim 9 wherein said plasma polymer film consists of two layers, the lower layer having a refractive index of 1.8 to 2.2 and the upper layer, a refractive index of 1.5 to 1.7.

11. A corrosion-resistant permanent magnet which comprises a sintered rare-earth-iron substrate magnet, a vapor-phase plated metal layer and a protective coating of a paraxylylene polymer film or a chloroparaxylylene polymer film formed by pyrolysis of dimers of paraxylylene or chloroparaxylylene on the metal layer.

12. A corrosion-resistant rare-earth-iron magnet which consists essentially of a rare-earth-iron substrate magnet having a surface treated with a plasma from one or more gases selected from rare gases and oxygen-containing gases, a plasma polymer film of hydrocarbon on the substrate magnet, said hydrocarbon selected from the group consisting of saturated or unsaturated lower alkyl hydrocarbons, and a protective coating of a paraxylylene polymer film or a chloroparaxylylene polymer formed by pyrolysis of dimers of paraxylylene or chloroparaxylylene on the plasma polymer film.

* * * * *